(12) United States Patent
Li et al.

(10) Patent No.: US 11,288,291 B2
(45) Date of Patent: Mar. 29, 2022

(54) METHOD AND SYSTEM FOR RELATION DISCOVERY FROM OPERATION DATA

(71) Applicant: INTERNATIONAL BUSINESS MACHINES CORPORATION, Armonk, NY (US)

(72) Inventors: Jia Qi Li, Beijing (CN); Fan Jing Meng, Beijing (CN); Jing Min Xu, Beijing (CN); Pei Ni Liu, Beijing (CN); Zi Xiao Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 33 days.

(21) Appl. No.: 16/819,144

(22) Filed: Mar. 15, 2020

(65) Prior Publication Data

US 2021/0286828 A1   Sep. 16, 2021

(51) Int. Cl.
| | |
|---|---|
| *G06F 16/28* | (2019.01) |
| *G06N 5/02* | (2006.01) |
| *G06F 16/182* | (2019.01) |
| *G06F 16/17* | (2019.01) |

(52) U.S. Cl.
CPC ........ *G06F 16/288* (2019.01); *G06F 16/1734* (2019.01); *G06F 16/182* (2019.01); *G06F 16/285* (2019.01); *G06N 5/022* (2013.01)

(58) Field of Classification Search
CPC .... G06F 16/288; G06F 16/182; G06F 16/285; G06F 16/1734; G06F 21/6227; G06F 11/324; G06F 11/3409; G06F 16/2358; G06F 16/2365; G06N 5/022; H04L 43/08; H04L 67/1097; H04L 63/102; H04L 67/10; H04L 67/12; H04L 43/04; H04L 43/045; H04L 43/16; H04L 63/20
USPC ........................................................ 707/802
See application file for complete search history.

(56) References Cited

U.S. PATENT DOCUMENTS

| | | | |
|---|---|---|---|
| 9,734,005 B2 | 8/2017 | Ruan et al. | |
| 10,505,825 B1* | 12/2019 | Bettaiah | H04L 43/045 |
| 2010/0332540 A1* | 12/2010 | Moerchen | G06F 11/008 |
| | | | 707/776 |
| 2016/0124823 A1* | 5/2016 | Ruan | G06F 11/0709 |
| | | | 714/26 |

(Continued)

FOREIGN PATENT DOCUMENTS

CN    109921938 A    6/2019

OTHER PUBLICATIONS

List of IBM Patents or Patent Applications Treated as Related, 2 pgs.

(Continued)

*Primary Examiner* — Evan Aspinwall
(74) *Attorney, Agent, or Firm* — Intelletek Law Group, PLLC; Gabriel Daniel, Esq.

(57) ABSTRACT

A method and system for relation discovery from operation data includes classifying categories of extracted entities from operation data into three or more classes identified in a knowledge base. A log affiliation of the extracted entities is determined, and relations of the extracted entities are identified according to a log affiliation. The identified relations information of the extracted entities is associated with operation objects of the operation data.

20 Claims, 14 Drawing Sheets

(56) References Cited

U.S. PATENT DOCUMENTS

2017/0249200 A1* 8/2017 Mustafi .............. G06F 11/076

OTHER PUBLICATIONS

Mell, P. et al., "Recommendations of the National Institute of Standards and Technology"; NIST Special Publication 800-145 (2011); 7 pgs.
Puri, C., "Event Correlation across Log Files: What is it and Why is it Important?"; Accenture.com, Technology Labs Blog (2014); 3 pgs.
Zheng, Z. et al., "System Log Pre-processing to Improve Failure Prediction"; Proceedings of DSN (2009); 6 pgs.

* cited by examiner

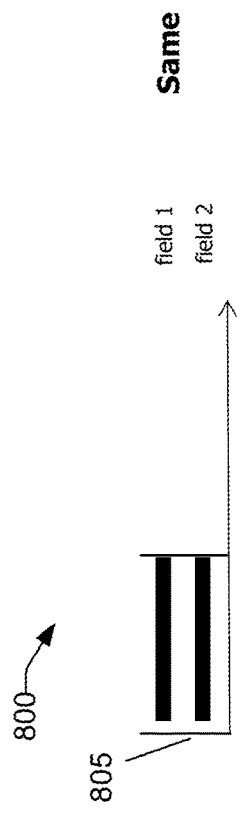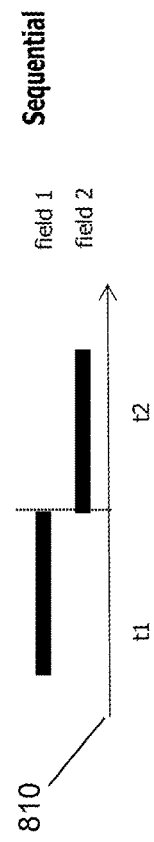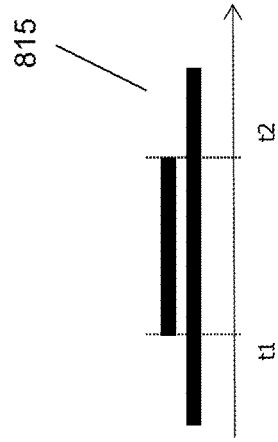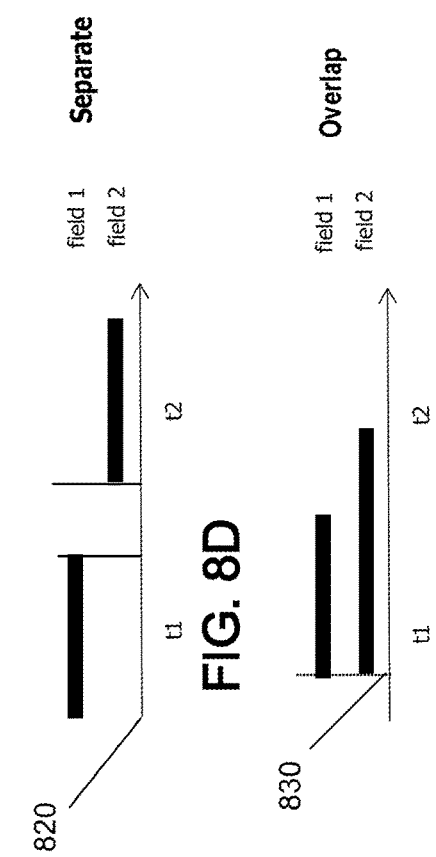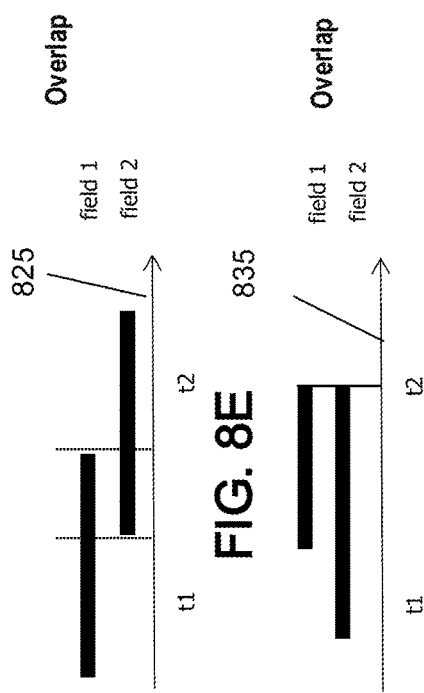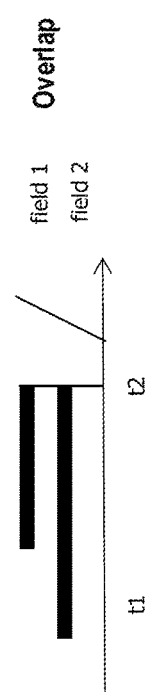

METHOD AND SYSTEM FOR RELATION DISCOVERY FROM OPERATION DATA

BACKGROUND

Technical Field

The present disclosure generally relates to hybrid cloud and multi-cloud computing. More particularly, the present disclosure relates to workload distribution across a hybrid cloud or a multi-cloud environment.

Description of the Related Art

There continues to be an increase in the use of cloud computing, particularly with regard to distributing a workload across a hybrid cloud or multi-cloud computing environment.

SUMMARY

According to various embodiments, a method, system and non-transitory machine readable medium for operation objects discovery from operation data are disclosed herein.

In one embodiment, a computer-implemented method for relation discovery from operation data includes the classifying of categories of extracted entities into three or more classes identified in a knowledge base. A log affiliation of the extracted entities is determined. The relations of the extracted entities are identified according to a log affiliation. Relations information of the extracted entities that are associated with operation objects of the operation data are output.

In an embodiment, the method further includes the operations of: in response to determining the log affiliation of the extracted entities are in a same log, discovering correlation relations for each pair of entities in the same log. There is a building of bi-directional relations in the same log for each pair of entities. Aggregation relations are identified using field mapping for each pair of entities, and there is a differentiating of types and directions of relations referring to the categories of each pair of entities.

In an embodiment, the identifying of dependency relations of the categories of each pair of entities includes performing life-circle evaluation, entity-object mapping and sequence mining.

In an embodiment, a defining of unidirections of relations is performed by determining a sequential order of the categories of each pair of entities.

In an embodiment, the classifying categories of extracted entities includes searching a node type dictionary in the knowledge base.

In one embodiment, in response to determining that the log affiliation of the extracted entities are in different logs, the computer-implemented method includes binding a connection of the extracted entities isolated in different logs by performing statistical correlation analysis of each field using data profiling to remove redundancy of existing relations of the extracted entities. There is a mapping of the relations between the extracted entities to the operation objects. The knowledge base is updated by assigning entities into corresponding sets of the classified categories.

In one embodiment, as system for relation discovery from operation data includes a classifier configured to classify categories of extracted entities from operation data into three or more classes identified in a knowledge base. A correlation discovery module is configured to determine a log affiliation of the extracted entities, to identify relations of the extracted entities according to a log affiliation, and to output relations information of the extracted entities associated with operation objects of the operation data.

In one embodiment, a correlation discovery module is configured to discover correlation relations of each pair of entities in the same log. There is a building of bi-directional relations in the same log for each pair of entities. A composition/aggregation relations discovery module is configured to identify composition and aggregation relations by a field mapping module performing field mapping for each pair of entities. A bi-directional edges discovery module and a unidirectional edges discovery module configured to differentiate types and directions of relations referring to the categories of each pair of entities.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIGS. 8A, 8B, 8C, 8D, 8E, 8F and 8G are illustrative examples of a life-circle evaluation, consistent with an illustrative embodiment.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Aspects of the present disclosure are applicable to both hybrid cloud computing, and multi-cloud computing. Hybrid cloud computing is a type of strategy for operation of a single type of task. On the other hand, multi-cloud computing is a type of cloud management strategy in which several providers may be used to perform more than one type of task. It is to be understood that multi-cloud computing may include hybrid cloud computing as a component.

When workloads are distributed across multi-cloud computing environments, there are segmented operations that can be analyzed to enhance system operation. For example, system visualization, statistical analysis and pattern mining, operation correlation, and deployment management can be monitored based on operation information associated with the distributed workloads.

The various aspects of the present disclosure provide an improvement in multi-cloud and hybrid cloud operation, by providing relation discovery from operation data such that the relations between the operation objects at multiple levels of multi-cloud and hybrid cloud can be more efficiently monitored. The management of network operations can be enhanced. In addition, the present disclosure provides for an improvement in computer operations, in part through the application of the data profiling de-duplication of redundant data, provides for an improvement in network efficiency of the overall network throughput, and allows for more efficient storage utilization by reducing network data transfers to reduce the number of bytes that are transmitted.

Example Architecture

A multi-cloud computing architecture includes the components and subcomponents that are used for multi-cloud computing. For example, such multi-cloud computing architecture can include a front end platform with front end software architecture, a back end platform with back end software architecture, a network and a multi-cloud based delivery. The front end architecture may include a user interface and enables the user to interact with cloud computing software. Web browsers, local networks and common web apps are examples of the front end software architecture. The back end architecture includes hardware and storage, and includes management and security.

Figure 1:
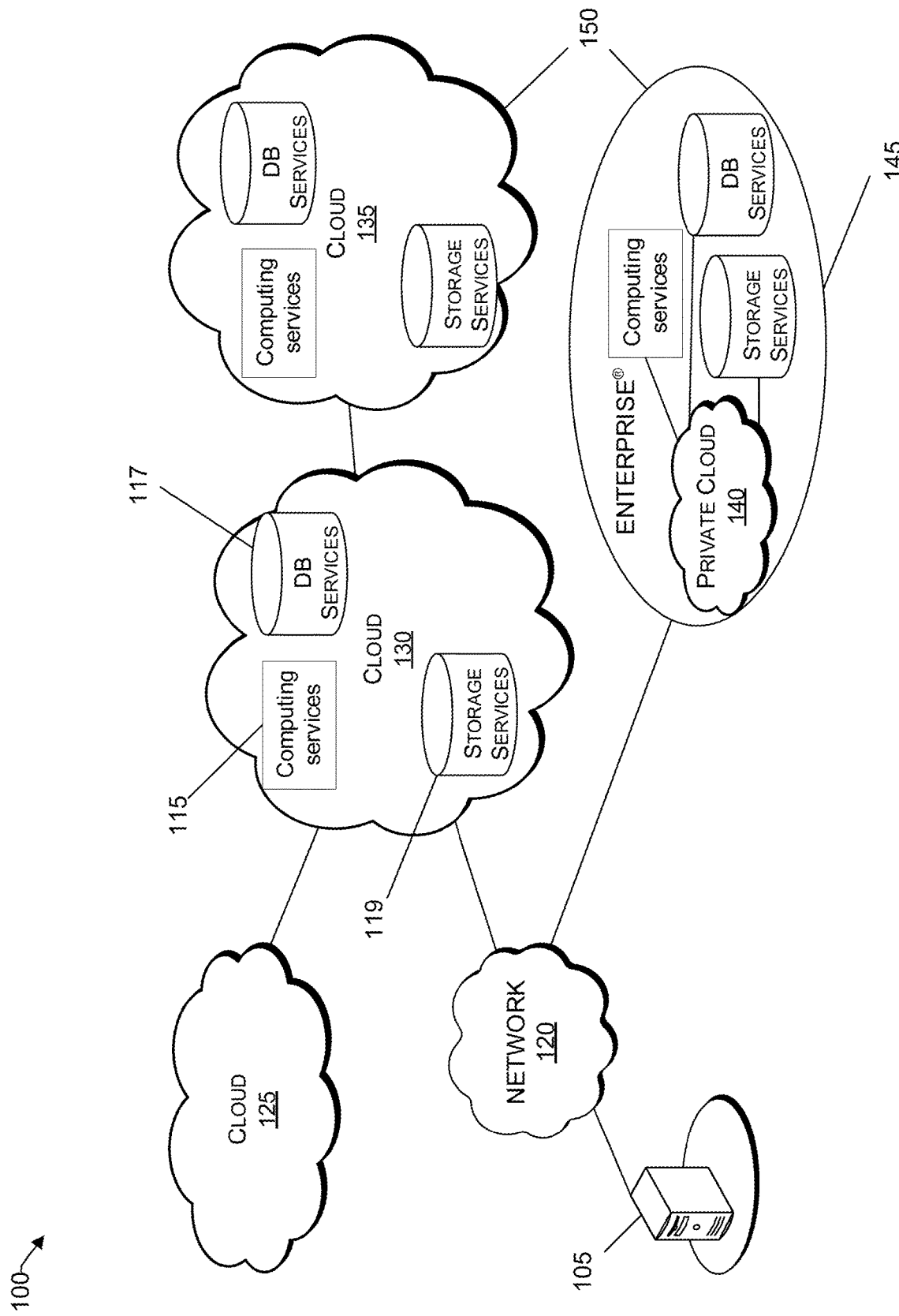
FIG. 1 is an illustration of a multi-cloud computing architecture, consistent with an illustrative embodiment.

FIG. 1 is an illustration of a multi-cloud computing architecture 100, consistent with an illustrative embodiment. It is to be understood that the architecture shown in FIG. 1 is provided for illustrative purposes, and the present disclosure is not in any way limited to the arrangement shown and described. A user interface 105, which may include a server, laptop, desktop, tablet, smart device, etc., communicates with network 120 to access a multi-cloud environment 125, 130, 135, 140 that includes public clouds 125, 130, 135, and a private cloud 140 that is part of an Enterprise® platform 145.

Each of the public clouds 125, 130, 135 can include, for example, computing services 115, database services 117, and storage services 119. One or more of the clouds 125, 130, 135, 140 shown may have fewer services, or more services, than shown. The private cloud 140 that is part of the Enterprise® platform 145 in this illustrative embodiment also includes the computing services 115, database services 117, storage services 119. The hybrid cloud 150 is formed by, for example, a public cloud 135 and the Enterprise® platform 145 having the private cloud 140 managed by a user.

Example Block Diagram

Figure 2:
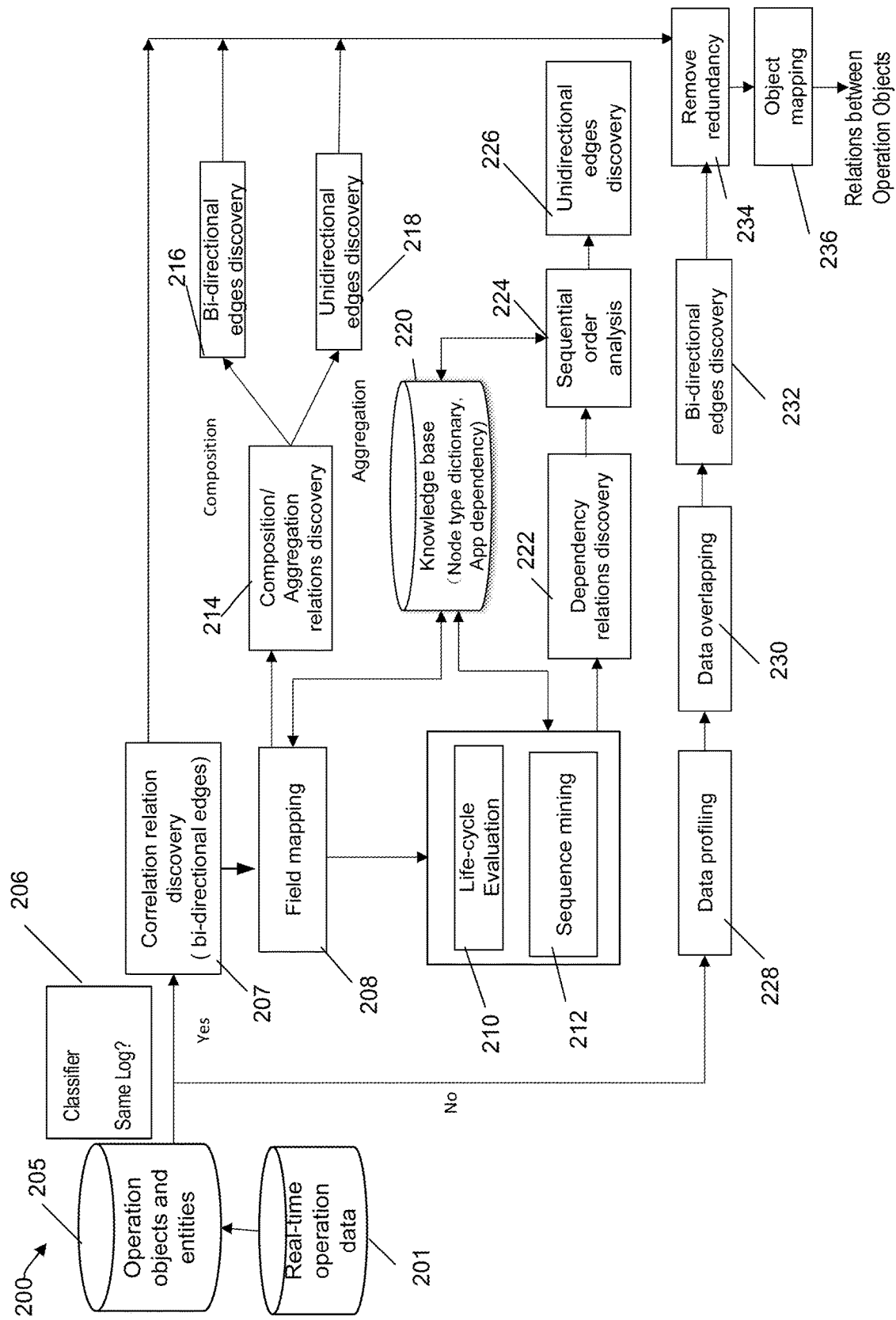
FIG. 2 is an illustration of a system for relation discovery from operation data, consistent with an illustrative embodiment.

Reference now is made to FIG. 2, which is an example block diagram of a system 200 that is configured to perform operation objects discovery from operation data consistent with an illustrative embodiment.

Operation objects and entities 205 are extracted from real-time operation data 201. A classifier 206 determines whether the entities are in the same log or not, and classifies categories of extracted entities from operation data into three or more classes identified in a knowledge base 220. The classified extracted entities are processed by the correlation relation discovery module 207 when the entities are in the same log. The correlation discovery module 207 discovers correlation relations of each pair of entities in the same log. A field mapping module 208 is configured to index data that is to be stored. The field mapping module 208 communicates with the knowledge database 220 to provide information, including but not limited to indexing information, to the knowledge base 220.

A composition/aggregation relations discovery module 214 communicates with the field mapping module 208 and is configured to identify composition and aggregation relations for each pair of entities. A bi-directional edges discovery module 216 and a unidirectional edges discovery module 218 are configured to differentiate types and directions of relations referring to the categories of each pair of entities. For example, composition information is provided to the bi-directional edges discovery module 216, and aggregation information is provided to the unidirectional edges discovery module 218.

A dependency relations discovery module 222 is configured to identify dependency relations output by a life-circle evaluation module 210 configured to perform life-circle evaluation. A sequence mining module 212 is configured to perform sequence mining based on the categories of each pair of entities. A sequential order analysis module 224 defines unidirections of relations by determining a sequential order of the categories of each pair of entities.

With continued reference to FIG. 2 the data profiling module 228 is used to analyze and generate statistics about the data. A data overlapping module 230 is configured to perform entity overlapping. The bi-directional edges module 232 is configured to determine bi-directional edge flows between nodes. The remove redundancy module 234 is used, for example, in data de-duplication to remove repeated data and free up storage sources and system throughput. The object mapping module 236 maps the operation objects and the pairs of entities.

Figure 3:
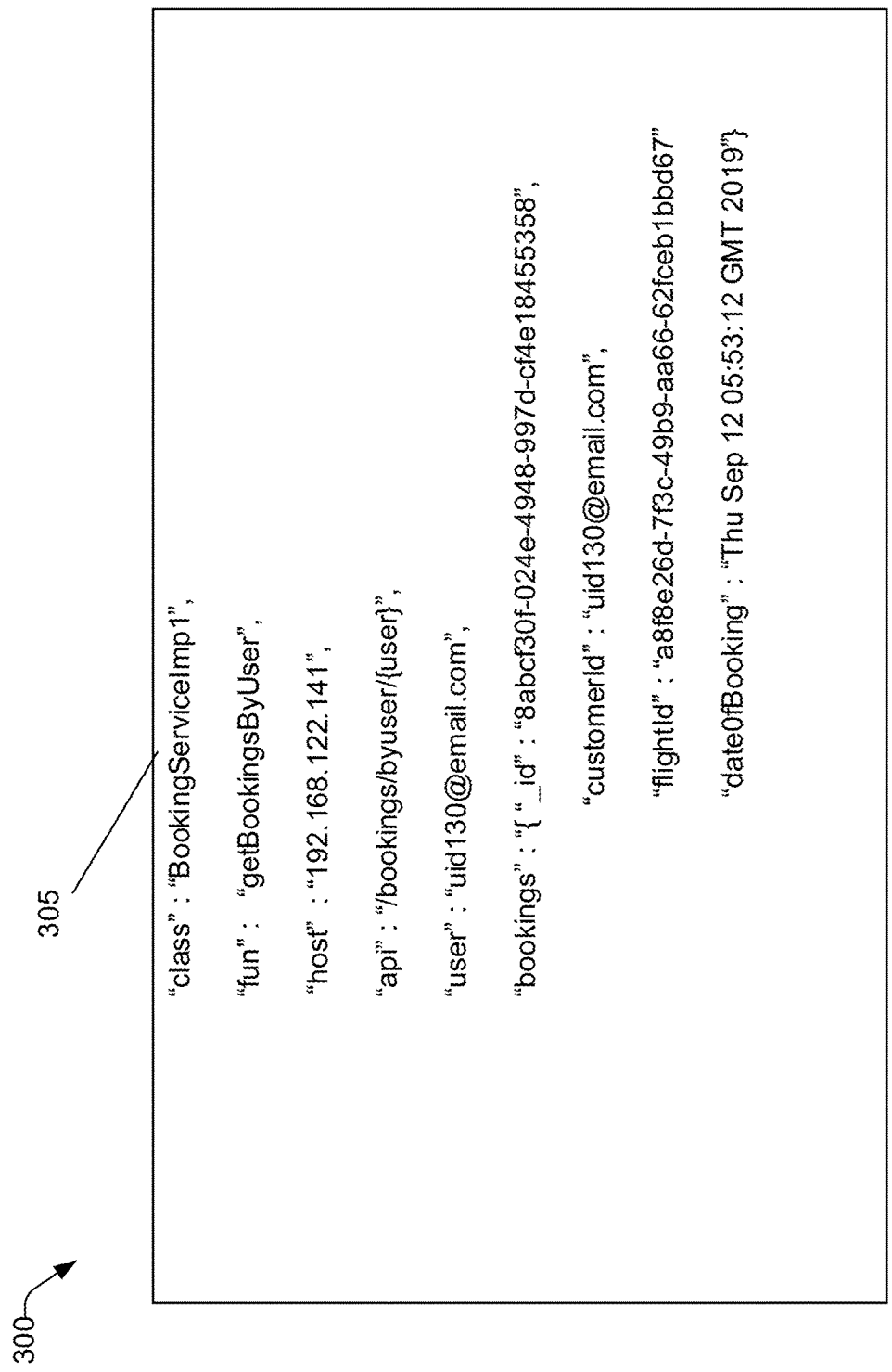
FIG. 3 is an illustrative example of log data, consistent with an illustrative embodiment.

FIG. 3 is an example of log data 305, consistent with an illustrative embodiment. Operational data, which is in this illustrative embodiment stored in logs, can have attributes that can be identified and extracted. There are various fields such as "class", "fun", "host", "api", "user", "bookings", "id", "customerID", "flightId" and "dateofBooking". The fields in the log include various attributes, and the type of attributes can be text, numerical, or a combination of numerical and text attributes. The operation data, which includes logs of information, is analyzed to discover operation objects

Example Processes

Figure 4:
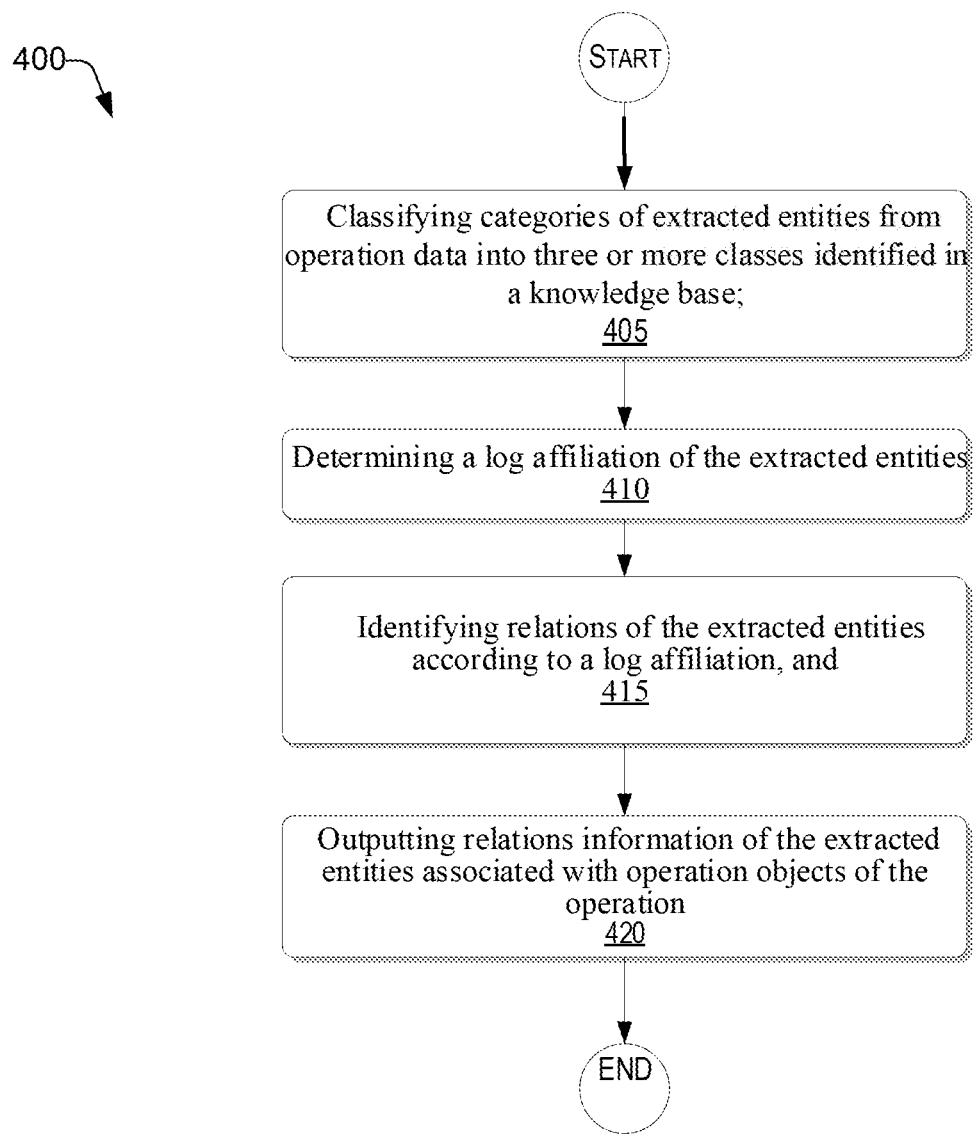
FIG. 4 illustrates an overview of a method of relation discovery from operation data, consistent with an illustrative embodiment.

With the foregoing overview of the example architecture 100 and conceptual block diagram of a system 200, it may be helpful now to consider a high-level discussion of example processes. To that end, FIG. 4 presents illustrative processes related to various aspects of a computer-implemented method for relation discovery from operation data. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process.

At operation 405, classifying categories of extracted entities from operation data into three or more classes identified in a knowledge base;

At operation 410, there a log affiliation of the extracted entities is determined. For example, with reference to FIG. 2, if the objects and entities are in the same log, the extracted dated is processed differently than in the case where the objects and entities are in different logs.

At operation 415, there is a discovery of (e.g. identifying) of relations of the extracted entities according to a log affiliation.

At operation 420, there is an output of relations information of the extracted entities associated with operation objects of the operation. The process, in this illustrated embodiment ends. However, in other illustrative embodiments, the determining whether the entities are in the same log or different logs results in different operations being performed, as can be seen by the operation of the modules in FIG. 2.

Figure 5A:
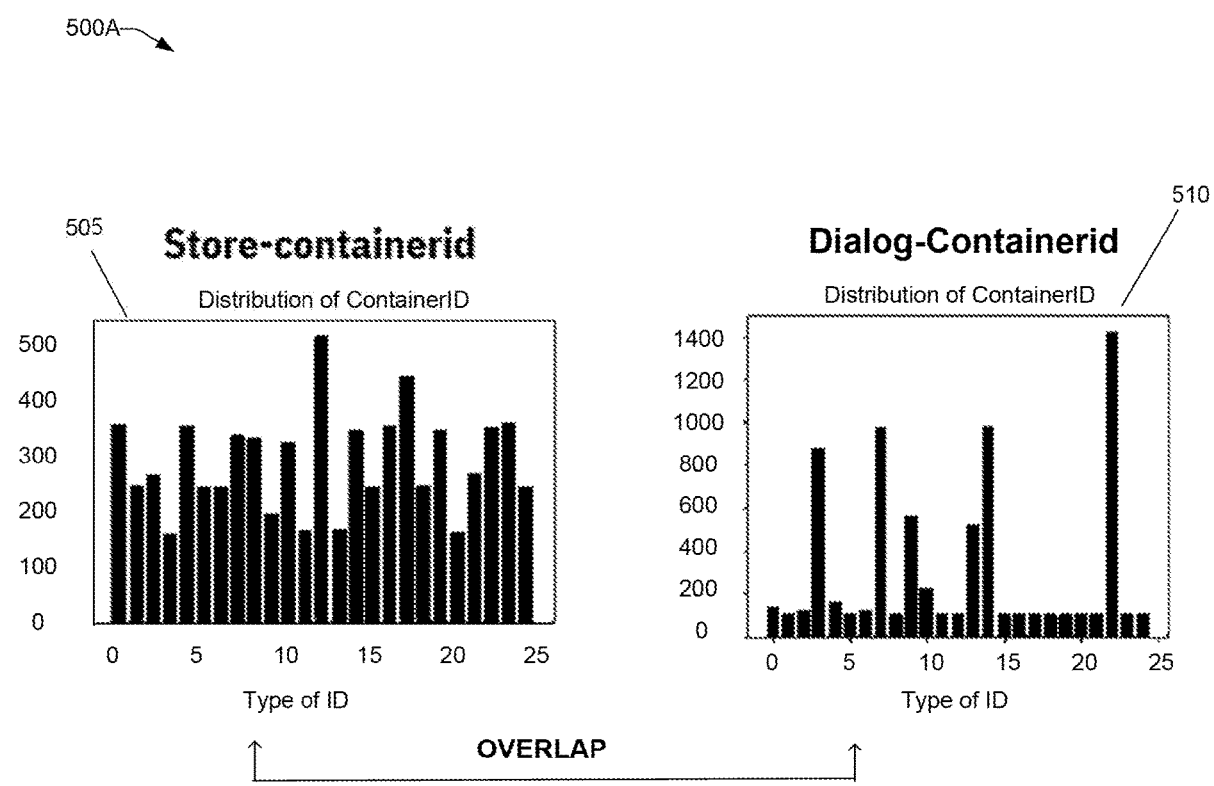
FIGS. 5A to 5C provide an overview of data profiling and data overlapping, consistent with an illustrative embodiment.
Figure 5B:
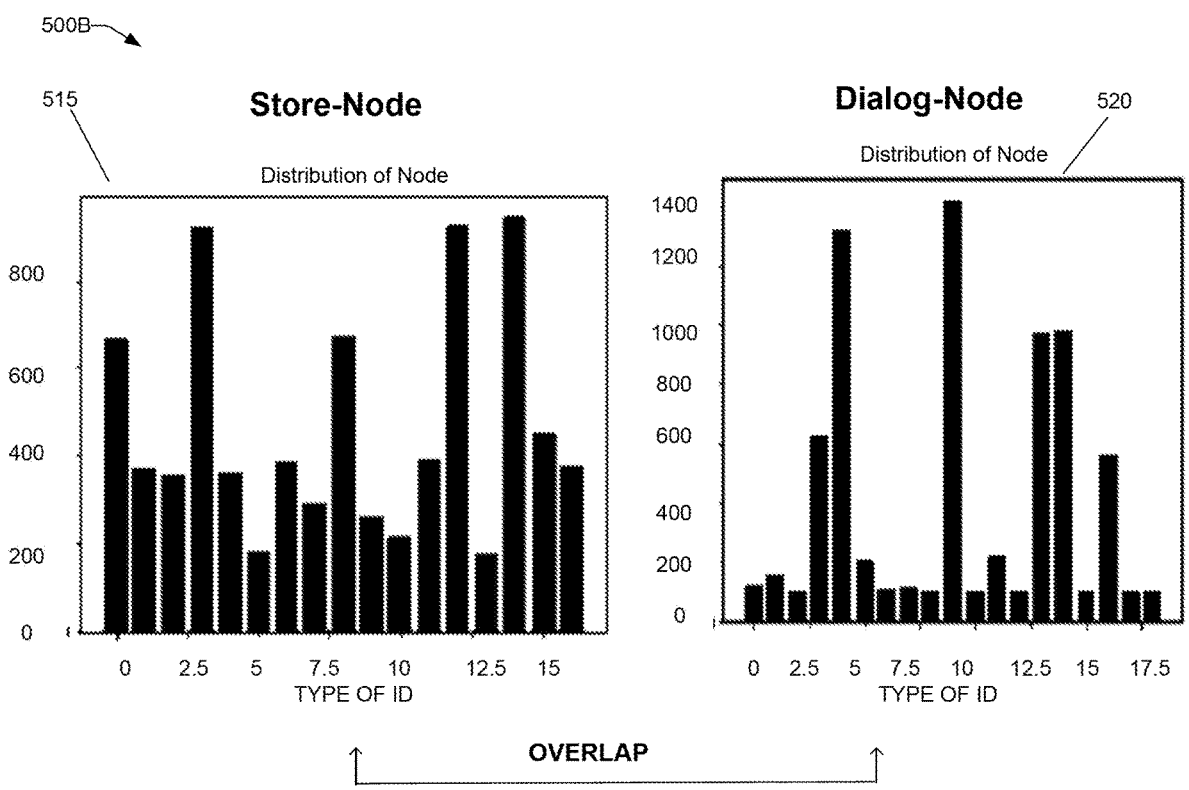
Figure 5C:
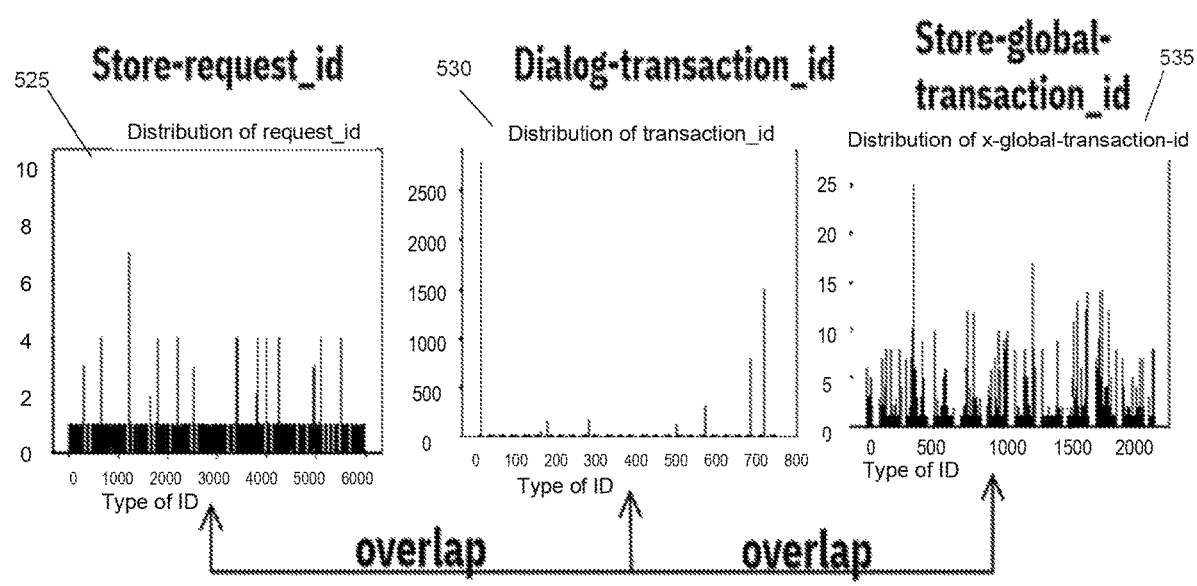
Figures 6A, 6B, 6C, 6D:
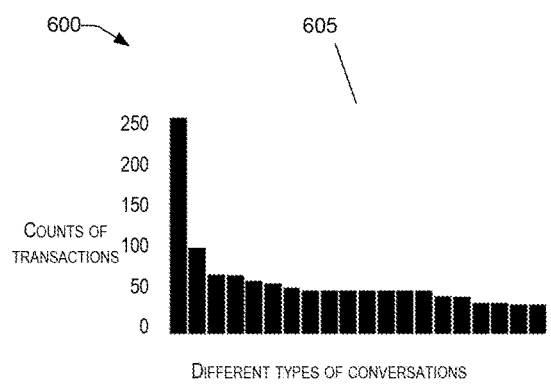
FIGS. 6A, 6B, 6C and 6D are illustrative examples of field mapping, consistent with an illustrative embodiment.
Figure 7A:
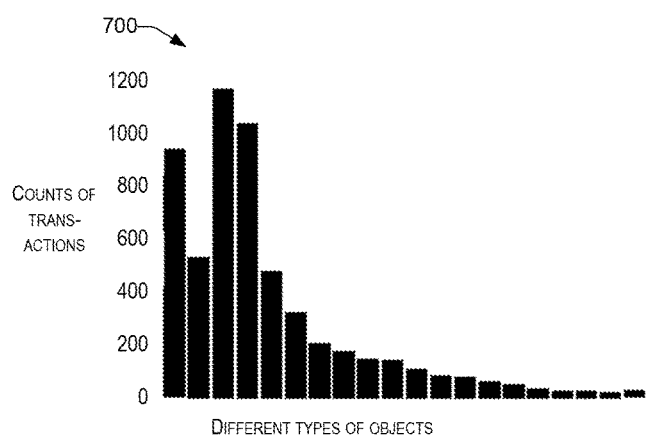
FIGS. 7A, 7B, 7C and 7D are illustrative examples of field mapping, consistent with an illustrative embodiment.
Figure 7B:
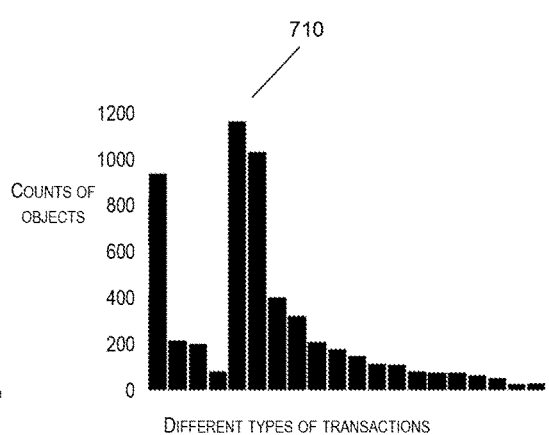
Figure 7C:
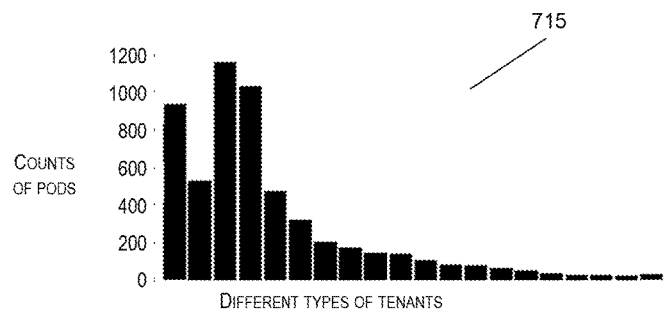
Figure 7D:
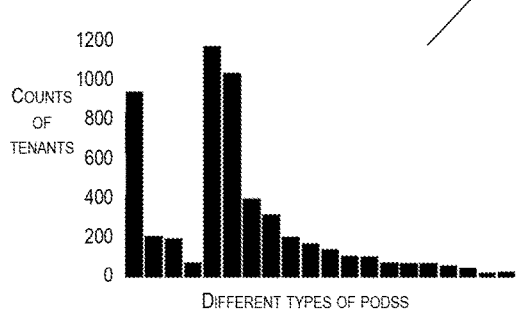

FIGS. 5A to 5C provide an overview 500A to 500C of data profiling and data overlapping, consistent with an illustrative embodiment. A containerID can be used to bundle information about a device, or nodes. As show by the bracket, the operations performed are different depending on whether there is the same field or different fields. For example, for the same field (e.g. ip-ip, or user-user) at 505 there is a storecontainerID showing distribution of a containerID and, at 510 there is shown a DialogcontainerID also showing distribution of a storecontainerID. In the two graphs, the Y coordinates are "Number of a specific type" and the x coordinates are the type of ID. The storenode graph 515 and dialognode graph 520 display the distribution of nodes, with similar X and Y coordinates. For different fields graphs 525, 530 and 535 are shown.

FIGS. 6A, 6B, 6C and 6D are illustrative examples of field mapping, consistent with an illustrative embodiment, showing respecting graphs 05, 610, 615 and 620. FIG. 2 shows a block diagram of a field mapping module 208. The field mapping operation can be performed to map data fields to index fields. Data such as counts of pods versus different types of conversations (FIG. 6A), counts of objects versus different types of transactions (FIG. 6B), counts of transactions versus different types of objects (FIG. 6C), and counts of objects versus different types of pods (FIG. 6D) can be used to map the extracted entities from operation data to an index.

FIGS. 7A, 7B, 7C and 7D are illustrative examples 705, 710, 715 and 720, respectively, of field mapping, consistent with an illustrative embodiment. The field mapping can be used in the discovery of composition or aggregation relations, for example, to differentiate types and directions of relations with reference to the categories of each pair of entities.

FIGS. 8A, 8B, 8C, 8D, 8E, 8F and 8G are illustrative examples 805, 810, 815, 820, 825, 830, 835 of a life-circle evaluation, consistent with an illustrative embodiment. The graphs show fields 1 and 2 that are the identified the same, sequential, overlap, or conclude. The period is shown from t1 to t2. Life-circle evaluation is performed by the life-cycle evaluation module 210. The life circle evaluation is used as part of the process to discover dependency relations, and the evaluation can be provided to the dependency relations discovery module 222 shown in FIG. 2.

Figure 9:
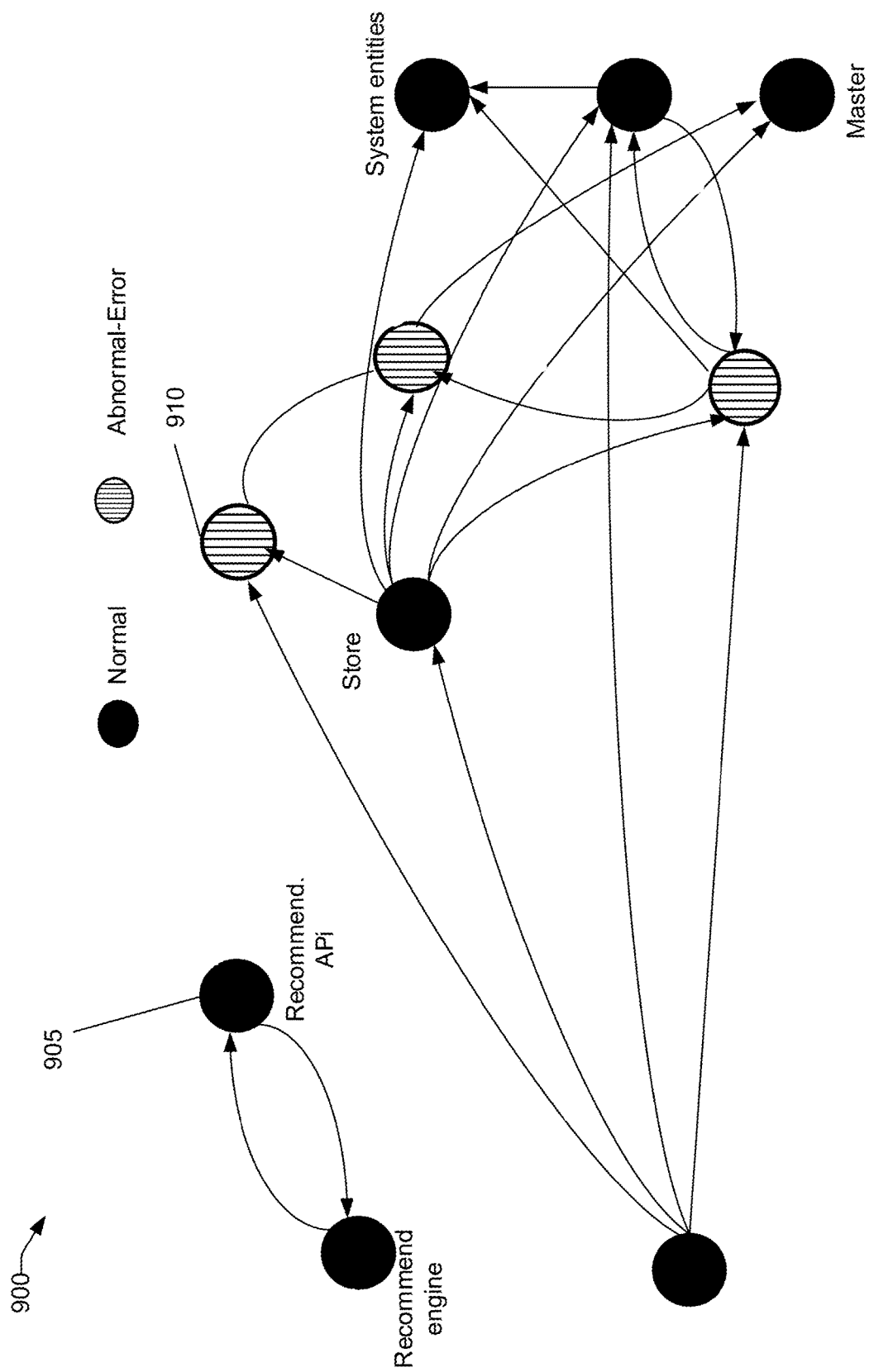
FIG. 9 is an example of sequence mining, consistent with an illustrative embodiment.

FIG. 9 is an example of sequence mining, consistent with an illustrative embodiment. Sequence mining is the analysis of data to find statistically relevant patterns or trends, and the data is provided in a sequence. FIG. 9 shows normal node 905 operation (black circle) and abnormal-error 910 (striped circle). The arrows connecting the nodes identify sequences of the data.

Example Computer Platform

Figure 10:
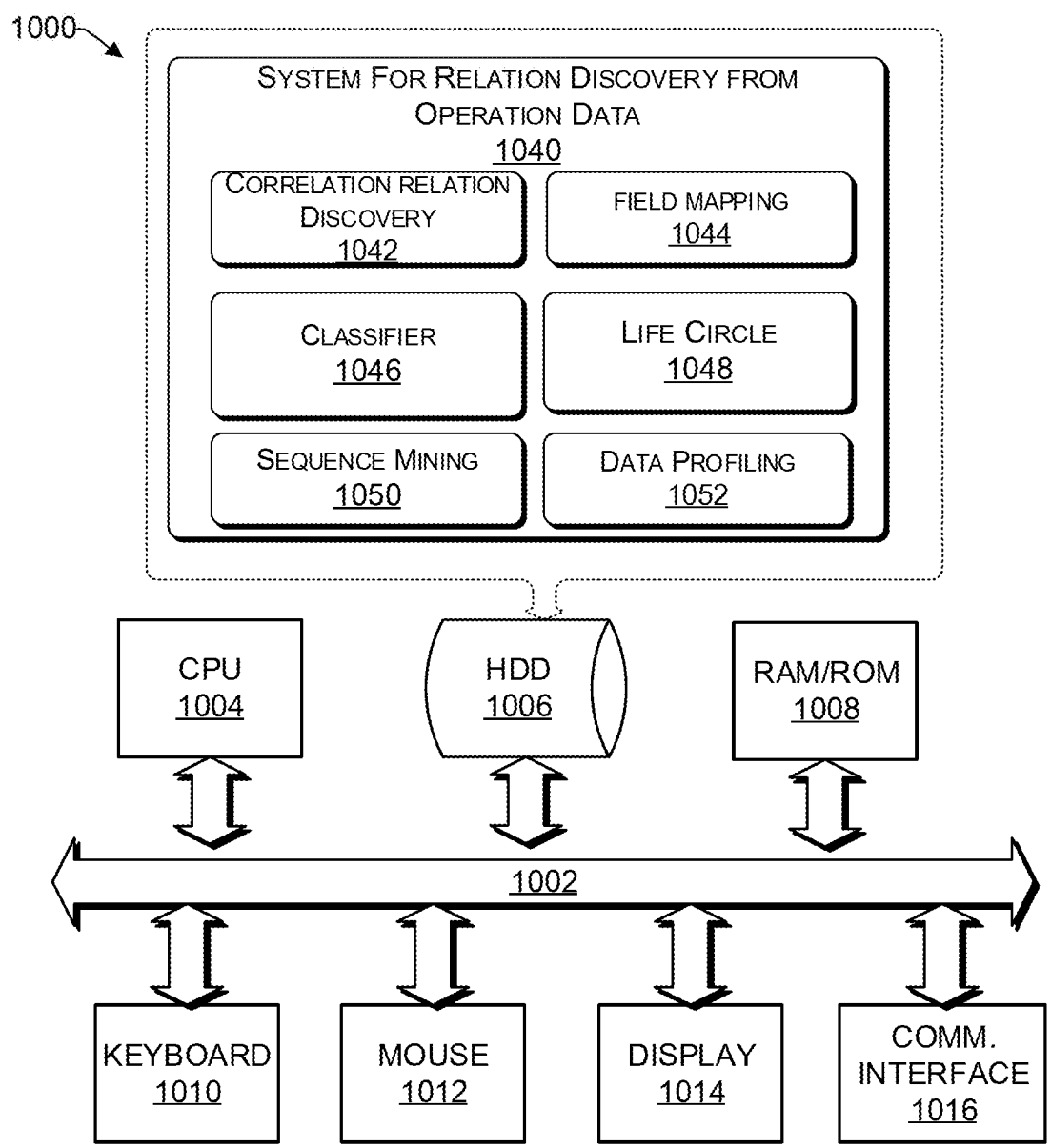
FIG. 10 is a functional block diagram illustration of a computer hardware platform that can communicate with various networked components, consistent with an illustrative embodiment.

Referring now to FIG. 10, functions relating to attribute discovery for operation objects from operation data can be performed with the use of one or more computing devices connected for data communication via wireless or wired communication, as shown in FIG. 1 and in accordance with the process 400 of FIG. 4.

FIG. 10 provides a functional block diagram illustration of a computer hardware platform that is capable performing attribute discovery for operation objects from operation data, as discussed herein. In particular, FIG. 10 illustrates a network or host computer platform 1000, as may be used to implement an appropriately configured server, such as the server 105 of FIG. 1.

The computer platform 1000 may include a central processing unit (CPU) 1004, a hard disk drive (HDD) 1006, random access memory (RAM) and/or read only memory (ROM) 1008, a keyboard 1010, a mouse 1012, a display 1014, and a communication interface 1016, which are connected to a system bus 1002.

In one embodiment, the HDD 1006, has capabilities that include storing a program that can execute various processes, such as the system for relation discovery from operation data 1040, in a manner described herein. The engine system may have various modules configured to perform different functions.

For example, there is a correlation relation discovery module 1042 that is configured to determine a log affiliation of the extracted entities, to identify relations of the extracted entities according to a log affiliation, and to output relations information of the extracted entities associated with operation objects of the operation data. In one embodiment, there is a field mapping module 1044 is configured to index data that is to be stored. The field mapping module 208 communicates with a knowledge database to provide information, including but not limited to indexing information.

A classifier 1046 is configured to classify categories of extracted entities from operation data into three or more classes identified in a knowledge base. In addition, a life circle module 1048 is configured to identify dependency relations of the operation objects and entities. A sequence mining module 1050 is configured to analyze of data to find statistically relevant patterns or trends. A data profiling module 1052 is configured to remove redundancy of existing relations of the extracted entities. There is a mapping of the relations between the extracted entities to the operation objects. The knowledge base is updated by assigning entities into corresponding sets of the classified categories.

In one embodiment, a program, such as Apache™, can be stored for operating the system as a Web server. In one embodiment, the HDD 1006 can store an executing application that includes one or more library software modules, such as those for the Java™ Runtime Environment program for realizing a JVM (Java™ virtual machine).

Example Cloud Platform

As discussed above, functions relating to managing one or more client domains, may include a cloud 100 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
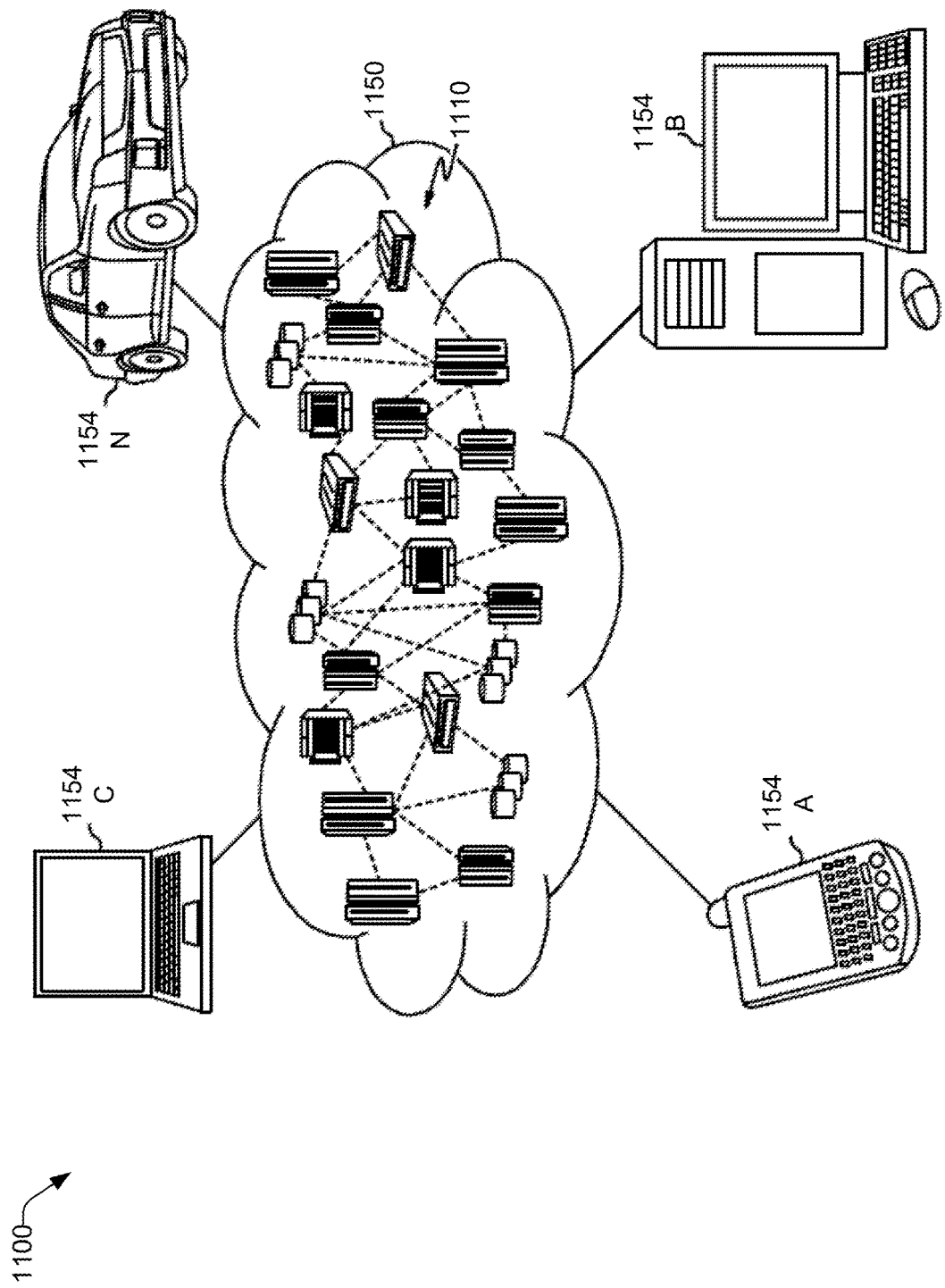
FIG. 11 depicts a cloud computing environment, consistent with an illustrative embodiment.

Referring now to FIG. 11, an illustrative cloud computing environment 1100 is depicted. As shown, cloud computing environment 1100 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
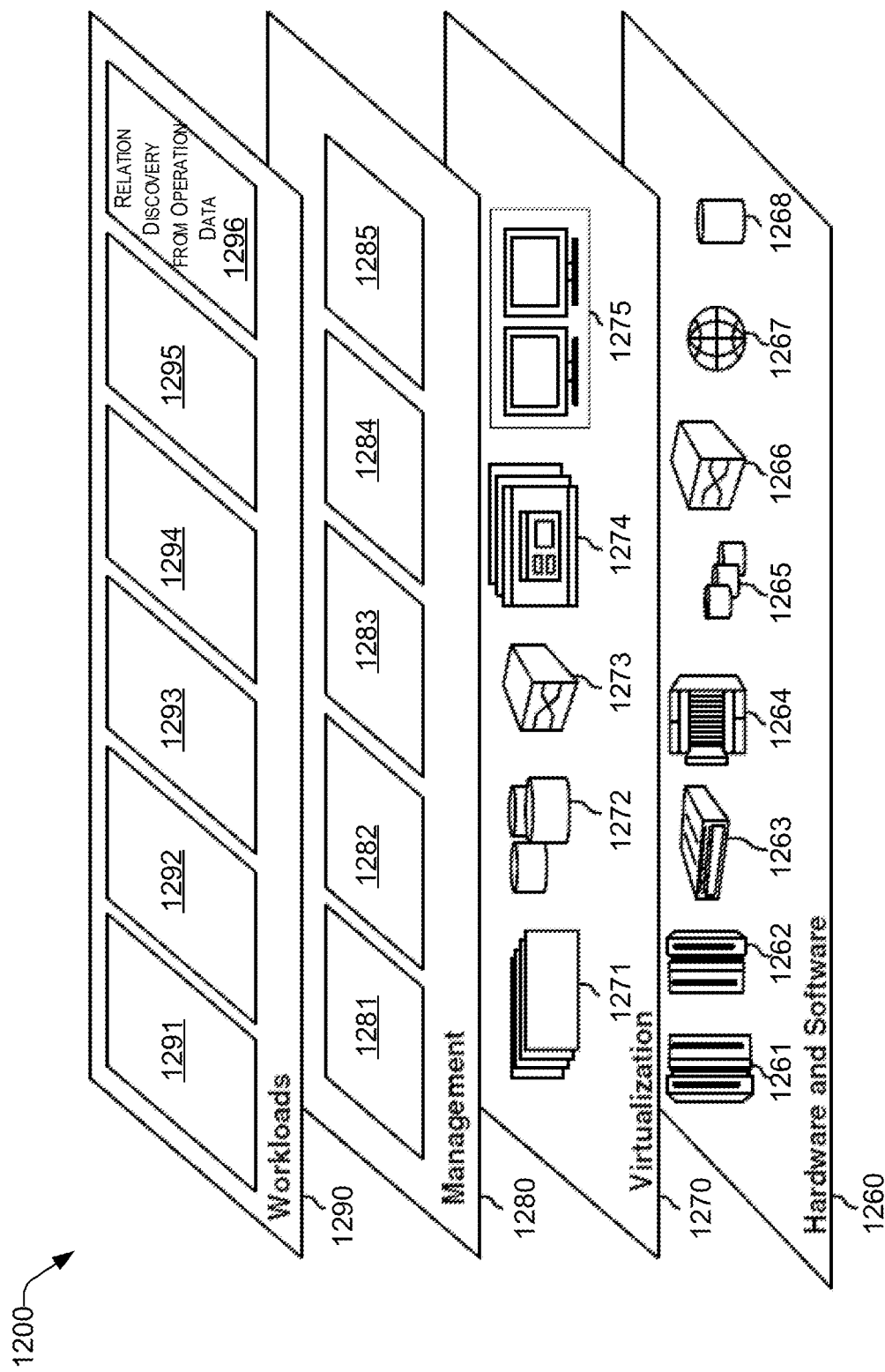
FIG. 12 depicts abstraction model layers, consistent with an illustrative embodiment.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 891; software development and lifecycle management 1292; virtual classroom education delivery 1293; data analytics processing 1294; transaction processing 1295; and a system for operation objects discovery from operation data 1296, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for relation discovery of operation objects from operation data of distributed workloads in a cloud computing environment, comprising:
classifying, by a computing device, categories of extracted entities from operation data of the distributed workloads into three or more classes identified in a knowledge base;
determining, by the computing device, a log affiliation of the extracted entities comprising determining if the operation objects and the extracted entities are in a same log;
identifying, by the computing device, relations of the extracted entities according to a log affiliation;
in response to determining the determining the log affiliation of the extracted entities are in different logs, freeing up a memory of the computing device by removing a redundancy of existing relations of the extracted entities; and
outputting, by the computing device, relations information of the extracted entities associated with operation objects of the operation data.

2. The computer-implemented method according to claim 1, further comprising, in response to determining the log affiliation of the extracted entities are in a same log:
discovering correlation relations of each pair of entities in the same log;
building bi-directional relations in the same log for each pair of entities;
identifying aggregation relations using a field mapping for each pair of entities; and
differentiating types and directions of relations referring to the categories for each pair of entities.

3. The computer-implemented method according to claim 2, further comprising:
identifying one or more dependency relations referring to the categories of each pair of entities.

4. The computer-implemented method according to claim 3, wherein the identifying dependency relations of the categories of each pair of entities includes performing a life-cycle evaluation, an entity-object mapping, and a sequence mining.

5. The computer-implemented method according to claim 4, further comprising defining unidirections of relations by determining a sequential order of the categories of each pair of entities.

6. The computer-implemented method according to claim 1, wherein the classifying categories of extracted entities includes searching a node type dictionary in the knowledge base.

7. The computer-implemented method according to claim 1, wherein the three or more classes identified in the knowledge base comprise commerce, application, and infrastructure.

8. The computer-implemented method according to claim 1, further comprising, in response to determining the determining the log affiliation of the extracted entities are in different logs:
binding a connection of the extracted entities isolated in different logs by performing a statistical correlation analysis of each field using data profiling;
mapping relations between the extracted entities to operation objects; and
updating the knowledge base by assigning entities into corresponding sets of the classified categories.

9. The computer-implemented method according to claim 8, wherein the performing of statistical correlation analysis of each field further comprises performing entity overlapping.

10. The computer-implemented method according to claim 8, wherein the three or more classes identified in the knowledge base comprise commerce, application, and infrastructure.

11. A system for relation discovery from operation data of distributed workloads in a cloud computing environment, comprising:
a classifier configured to classify categories of extracted entities from operation data of the distributed workloads into three or more classes identified in a knowledge base;
a redundancy module configured to, in response to determining the determining the log affiliation of the extracted entities are in different logs, freeing up a memory of the computing device by removing a redundancy of existing relations of the extracted entities; and
a correlation discovery module configured to:
determine a log affiliation of the extracted entities comprising determining if the operation objects and the extracted entities are in a same log;
identify relations of the extracted entities according to a log affiliation; and
output relations information of the extracted entities associated with operation objects of the operation data.

12. The system according to claim 11, further comprising:
a correlation discovery module configured to discover correlation relations of each pair of entities in a same log, and to build bi-directional relations in the same log for each pair of entities;
a composition/aggregation relations discovery module configured to identify composition and aggregation relations by a field mapping module performing field mapping for each pair of entities; and
a bi-directional edges discovery module and a unidirectional edges discovery module configured to differentiate types and directions of relations referring to the categories of each pair of entities.

13. The system according to claim 12, further comprising:
a dependency relations discovery module configured to identify dependency relations by a life-cycle evaluation module configured to perform a life-cycle evaluation;
a field mapping module configured to perform entity-object mapping; and
a sequence mining module configured to perform sequence mining based on the categories of each pair of entities.

14. The system according to claim 13, further comprising:
a sequential order analysis module configured to define unidirections of relations by determining a sequential order of the categories of each pair of entities.

15. The system according to claim 11, wherein the classifier module is configured to classify categories of extracted entities by searching a node type dictionary in the knowledge base.

16. The system according to claim 11, wherein the three or more classes identified in the knowledge base comprise commerce, application, and infrastructure.

17. The system according to claim 11, wherein in response to determining the determining the log affiliation of the extracted entities are in different logs, the method further comprising:

binding a connection of the extracted entities isolated in different logs by performing statistical correlation analysis of each field using data profiling;

mapping relations between the extracted entities to operation objects; and updating the knowledge base by assigning entities into corresponding sets of the classified categories.

18. The computer-implemented method according to claim 17, wherein the statistical correlation analysis of each field further includes a data overlapping module configured to perform entity overlapping.

19. The computer-implemented method according to claim 11, wherein the three or more classes identified in the knowledge base comprise commerce, application, and infrastructure.

20. A non-transitory computer readable storage medium tangibly embodying a computer readable program code having computer readable instructions that, when executed, causes a computer device to perform a method for relation discovery from operation data of distributed workloads in a cloud computing environment, the method comprising:

classifying, by the computer device, categories of extracted entities from an operation data of the distributed workloads into three or more classes identified in a knowledge base;

determining, by the computer device, a log affiliation of the extracted entities comprising determining if the operation objects and the extracted entities are in a same log;

identifying, by the computer device, relations of the extracted entities according to a log affiliation;

in response to determining the determining the log affiliation of the extracted entities are in different logs, freeing up a memory of the computing device by removing a redundancy of existing relations of the extracted entities; and outputting, by the computer device, relations information of the extracted entities associated with operation objects of the operation data.

\* \* \* \* \*